United States Patent
Hosokawa

(10) Patent No.: US 11,290,018 B2
(45) Date of Patent: *Mar. 29, 2022

(54) POWER CONVERTER AND IMAGE PROCESSING APPARATUS

(71) Applicant: TOSHIBA TEC KABUSHIKI KAISHA, Tokyo (JP)

(72) Inventor: Yoshiaki Hosokawa, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/828,324

(22) Filed: Mar. 24, 2020

(65) Prior Publication Data

US 2021/0305900 A1    Sep. 30, 2021

(51) Int. Cl.
*H02M 3/335*    (2006.01)
*G03G 15/00*    (2006.01)
*H02M 1/32*    (2007.01)

(52) U.S. Cl.
CPC ........ *H02M 3/33523* (2013.01); *G03G 15/80* (2013.01); *H02M 1/32* (2013.01)

(58) Field of Classification Search
CPC ..... H02M 3/33523; H02M 1/32; G03G 15/80
USPC ........................................................ 363/50
See application file for complete search history.

(56) References Cited

U.S. PATENT DOCUMENTS

| 5,483,093 A * | 1/1996 | Murakami | H01L 27/0248 257/355 |
| 8,503,900 B2 * | 8/2013 | Inukai | G03G 15/5004 399/88 |
| 10,181,784 B2 * | 1/2019 | Arimoto | G03G 15/80 |
| 2012/0113685 A1 * | 5/2012 | Inukai | G03G 15/80 363/21.01 |
| 2014/0210264 A1 * | 7/2014 | Inukai | G03G 15/80 307/23 |
| 2016/0036340 A1 * | 2/2016 | Kikuchi | H02M 1/32 363/21.14 |
| 2018/0095403 A1 * | 4/2018 | Arimoto | H02M 1/08 |
| 2019/0115835 A1 * | 4/2019 | Cohen | H02M 3/1588 |

FOREIGN PATENT DOCUMENTS

JP     2018-57240 A     4/2018

* cited by examiner

*Primary Examiner* — Yemane Mehari
(74) *Attorney, Agent, or Firm* — Kim & Stewart LLP

(57) ABSTRACT

A power converter includes an insulating transformer including primary and secondary windings, a switching circuit configured to switch voltages applied to the primary winding, a power supply circuit connected to the secondary winding and configured to rectify and smooth a current flowing in the secondary winding and generate a DC voltage, an adjustment circuit configured to adjust the voltage and output the adjusted voltage that is a first voltage in a first mode and a second voltage that is less than the first voltage in a second mode, and a protection circuit including a first Zener diode and a second Zener diode and configured to stop output of the adjusted voltage. A cathode of the first diode is electrically connected to the power supply circuit. The second diode is connected in series to the first diode in the first mode and being short-circuited in the second mode.

20 Claims, 4 Drawing Sheets

POWER CONVERTER AND IMAGE PROCESSING APPARATUS

FIELD

Embodiments described herein relate generally to a power converter and an image processing apparatus.

BACKGROUND

Power converters for converting electric power are widely used. The power converter supplies power via a transformer. The power converter has a switching control circuit, typically an integrated circuit (IC), that controls a switching element to allow an alternating voltage to flow to a first side of the transformer. The switching control circuit operates using a voltage generated in an auxiliary winding, which is coupled to the transformer. The power converter includes a shunt regulator on a second side. The shunt regulator adjusts the voltage output from the second side of the transformer to a load. The adjustments by the shunt regulator are based on a reference voltage applied to a reference voltage terminal. The power converter adjusts the output voltage of the transformer to be a predetermined voltage by operation of the shunt regulator. The power converter also includes an overvoltage protection circuit for stopping the switching control circuit when the output voltage of the transformer equals or exceeds some threshold voltage level.

The power converter can switch voltage division ratios in the shunt regulator by controlling the connection of a switch or jumper to a resistor connected to the reference voltage terminal of the shunt regulator. Thus, the power converter can output desired voltages. Also, the threshold voltage level for the overvoltage protection circuit can be changed by controlling the connection of the switch or jumper. However, when the output voltage and the threshold voltage can be set independently, the protection function might not be operated normally or the protection function might be excessively operated.

DETAILED DESCRIPTION

In one embodiment, a power converter comprises an insulating transformer including a primary winding and a secondary winding, a switching circuit configured to switch voltages applied to the primary winding, a power supply circuit connected to the secondary winding and configured to rectify and smooth a current flowing in the secondary winding and generate a DC voltage, an adjustment circuit configured to adjust the generated DC voltage and output the adjusted DC voltage that is a first DC voltage in a first mode and a second DC voltage that is less than the first DC voltage in a second mode, and a protection circuit including a first Zener diode and a second Zener diode and configured to stop output of the adjusted DC voltage. A cathode of the first Zener diode is electrically connected to the power supply circuit, and the second Zener diode is connected in series to the first Zener diode in the first mode and being short-circuited in the second mode.

Hereinafter, embodiments will be described with reference to the accompanying drawings.

Figure 1:
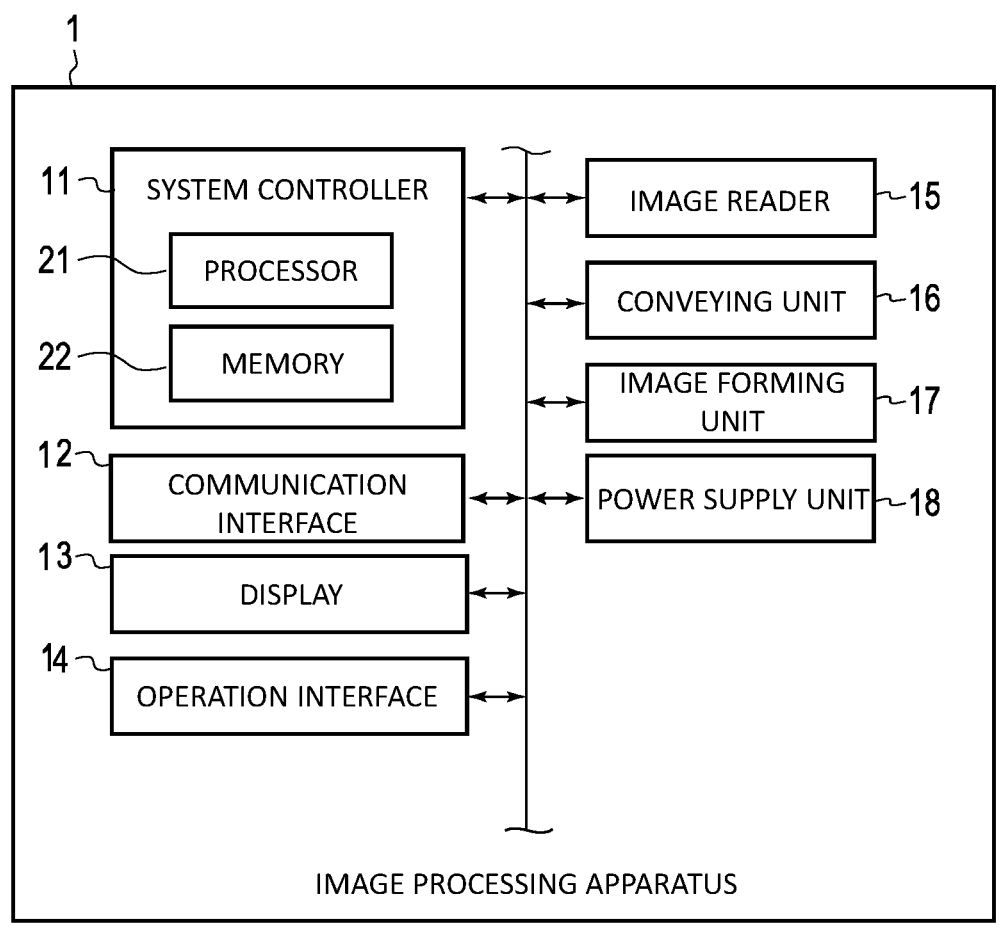
FIG. 1 is a diagram of an image processing apparatus according to an embodiment.

FIG. 1 is a diagram of an image processing apparatus 1 according to one embodiment.

The image processing apparatus 1 is a multi-function printer (MFP) that performs various processes such as image formation on a recording medium such as a printing medium. For example, the image processing apparatus 1 is a solid-state scanning type printer (for example, an LED printer) having an LED array. In some examples, the image processing apparatus 1 may be an ink jet printer having an ink jet head for ejecting ink, or may be another type of printer.

In the present embodiment, the image processing apparatus 1 charges a photosensitive drum and then irradiates the photosensitive drum with light corresponding to the image data for printing, thereby forming an electrostatic latent image on the photosensitive drum. The image processing apparatus 1 attaches toner to the electrostatic latent image formed on the photosensitive drum, transfers the toner adhering to the latent image on to a printing medium (such a sheet of paper or the like), and thus forms a toner image on the printing medium. The image processing apparatus 1 next applies heat and pressure to the printing medium to which the toner image has been transferred, thereby fixing the toner image on the printing medium.

The image processing apparatus 1 includes a system controller 11, a communication interface 12, a display 13, an operation interface 14, an image reader 15, a conveying unit 16, an image forming unit 17, and a power supply unit 18. The system controller 11, the communication interface 12, the display 13, the operation interface 14, the image reader 15, the conveying unit 16, the image forming unit 17, and the power supply unit 18 are installed in a housing.

The system controller 11 controls the image processing apparatus 1. The system controller 11 includes, for example, a processor 21 and a memory 22.

The processor 21 is an arithmetic element (for example, a CPU (Central Processing Unit)) for executing arithmetic processing. The processor 21 performs various processes on the basis of data such as programs stored in the memory 22. The processor 21 functions as a control unit capable of executing various operations by executing a program stored in the memory 22.

The memory 22 is a storage device or the like that can be used for storing programs and data used in the programs. The memory 22 can include a volatile memory that temporarily stores data or the like being processed by the processor 21. The memory 22 may further include a nonvolatile memory for storing the programs.

The communication interface 12 is an interface for communicating with a client device or the like which issues a print job via a network.

The display 13 displays a screen or screens in accordance with a signal supplied from a display control unit, such as the system controller 11 or a graphics controller. For example, the display 13 displays screens related to various settings of the image processing apparatus 1.

The operation interface 14 can have or include various input devices. The operation interface 14 supplies an operation signal corresponding to the operation made via the input device to the system controller 11. The input devices can be, but are not limited to, a touch sensor, a numeric keypad, a power-on key, a paper feed key, various function keys, and a keyboard. The touch sensor may be, for example, a resistive touch sensor, a capacitive touch sensor, or the like. The touch sensor acquires information indicating a position specified by a user in a certain region of the touch sensor. The touch sensor can be configured as a touch panel integrated with the display 13, so that the signal from the touch sensor indicates a touched position on a screen displayed on the display 13. Thus, a user touch selection can be input to the system controller 11.

The image reader 15 is configured to read an image printed on a document. The image reader 15 includes, for example, a scanner and an automatic document feeder (ADF). The scanner moves along a document while the document is on a glass plate (document platen) to acquire an image of the entire document. The image reader 15 can similarly acquire an image of the entire document by feeding/moving the document past a stationary scanner using the ADF.

The conveying unit 16 conveys a printing medium to the image forming unit 17, and then discharges the printing medium on which an image has been formed by the image forming unit 17 from the housing. The conveying unit 16 conveys printing media stored in a sheet cassette (not shown) one by one to the image forming unit 17. Further, the conveying unit 16 discharges the printing after the image has been formed by the image forming unit 17 to a paper discharge tray outside the housing.

The image forming unit 17 forms an image on a printing medium based on the control of the system controller 11. The image forming unit 17 includes at least a process unit, an exposure device, a transfer mechanism, and a fixing device. In some examples, the image forming unit 17 includes a process unit and an exposure device for each color of toner provided in the image forming unit. For example, the colors of toner can be cyan (C), magenta (M), yellow (Y), and black (K). The image forming unit 17 can fix a toner image of each color (CMYK) to the printing medium to form a color image.

The process unit in this example includes a photosensitive drum, a charger, and a development device. The photosensitive drum is a cylindrical drum with a photosensitive layer formed on an outer peripheral surface of the drum. In general, the photosensitive drum is rotated at a constant speed by a driving mechanism.

The charger uniformly charges the surface of the photosensitive drum. For example, the charger electrostatically charges the photosensitive drum to a particular negative potential by applying a voltage to the photosensitive drum using a charging roller.

The development device is an apparatus for attaching toner to the photosensitive drum. The development device includes a developer storage container, a stirring mechanism, a developing roller, a doctor blade, and the like.

The developer container is a container for storing toner discharged from a toner cartridge. A toner carrier is generally stored in the developer container in advance. The toner from the toner cartridge is stirred and mixed with the carrier by the stirring mechanism to form a developer. The carrier is typically stored in the developer container in the manufacturing process of the development device.

The developing roller rotates within the developer container to adhere the developer to the surface of the developing roller. The doctor blade is a member disposed at a predetermined distance from the surface of the developing roller. The doctor blade removes any excess portions of the developer adhering to the surface of the rotating developing roller. As a result, a layer of the developer having a thickness corresponding to the distance between the doctor blade and the surface of the developing roller is formed on the surface of the developing roller.

In this example, the exposure device includes a plurality of light emitting elements. The exposure device is used to form a latent image on the photosensitive drum by selectively irradiating the photosensitive drum with light from the light emitting elements. The light emitting elements are, for example, light-emitting diodes (LED) or the like. Each of the light emitting elements is configured to irradiate one point on the photosensitive drum. The plurality of light emitting elements are arranged in a row along a main scanning direction, which is a direction parallel to the rotation axis of the photosensitive drum.

The exposure device irradiates the photosensitive drum with the light emitting elements arranged along the main scanning direction, thereby forming one line of a latent image on the photosensitive drum. The exposure device forms the entire latent image (which comprises a plurality of different lines) by irradiating the rotating photosensitive drum.

In the above structure, when light is emitted from the exposure device onto the surface of the photosensitive drum that has been charged by the charger, an electrostatic latent image is formed. When the layer of developer formed on the surface of the developing roller is brought close to the surface of the photosensitive drum, toner contained in the developer adheres to the still charged portions electrostatic latent image formed on the surface of the photosensitive drum. As a result, a toner image is formed on the surface of the photosensitive drum corresponding to the electrostatic latent image.

The transfer mechanism transfers the toner image formed on the surface of the photosensitive drum to a printing medium. In this example, the transfer mechanism includes a first transfer belt, a secondary transfer roller, and a plurality of other rollers. The transfer mechanism receives the toner image from the surface of the photosensitive drum on an outer peripheral surface of the first transfer belt. The transfer mechanism conveys the toner image on the first transfer belt to a transfer nip at which the secondary transfer roller and the first transfer belt are in close contact with each other. The transfer mechanism thus transfers the toner image from the first transfer belt to the printing medium by passing a printing medium supplied by the conveying unit 16 through the transfer nip.

The fixing device fixes the toner image to the printing medium. The fixing device includes a heat roller for applying heat to a printing medium, a pressing roller for applying pressure to the printing medium, and a heater for heating the heat roller. The pressing roller forms a fixing nip with the heat roller at which the pressing roller and the heating roller are brought into close contact with each other and the pressing roller applies pressure to the heat roller. The fixing device applies heat and pressure to the printing medium passing the printing medium through the fixing nip. Thereby, the fixing device fixes the toner image formed on the printing medium. The printing medium which has passed through the fixing nip is then discharged to the paper discharge tray by the conveying unit 16.

Figure 2:
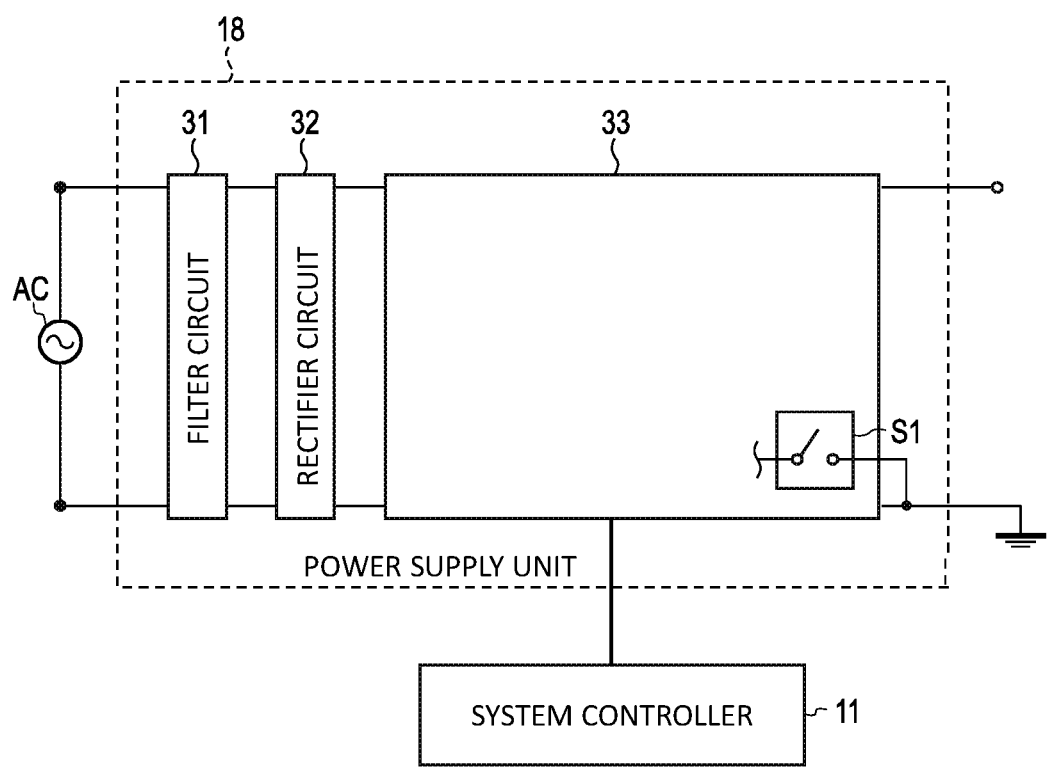
FIG. 2 is a diagram of a power supply unit according to an embodiment.

The power supply unit 18 is configured to supply power to the system controller 11 of the image processing apparatus 1, the communication interface 12, the display 13, the operation interface 14, the image reader 15, the conveying unit 16, and the image forming unit 17. FIG. 2 is an explanatory diagram of the power supply unit 18. As shown in FIG. 2, the power supply unit 18 includes a filter circuit 31, a rectifier circuit 32, and a power conversion circuit 33.

The filter circuit 31 is connected between the commercial power supply AC and the rectifier circuit 32. The filter circuit 31 is a noise removal circuit that prevents noise in a power conversion circuit 33 from leaking to the commercial power supply AC. The filter circuit 31 is, for example, an EMC (Electromagnetic Compatibility) filter. The filter circuit 31 includes, for example, a capacitor.

The rectifier circuit 32 rectifies the AC voltage received from the commercial power supply AC via the filter circuit 31, and supplies a pulsating positive voltage to a circuit in a subsequent stage. That is, the rectifier circuit converts the AC voltage into a positive voltage and supplies this positive voltage to the power conversion circuit 33. The rectifier circuit 32 is a full-wave rectifier circuit including a plurality of diodes, for example.

The power conversion circuit 33 is a circuit that supplies a DC voltage having a particular voltage value to the load. The power conversion circuit 33 has a first side to which electric power is supplied and a second side from which electric power is output. Depending on the states of an output selecting switch S1, the power conversion circuit 33 switches the DC voltages to be a first voltage (24V) or a second voltage (12V). A state in which the first voltage (24V) is output will be referred to as a first mode, and a state in which the second voltage (12V) is output will be referred to as a second mode.

Figure 3:
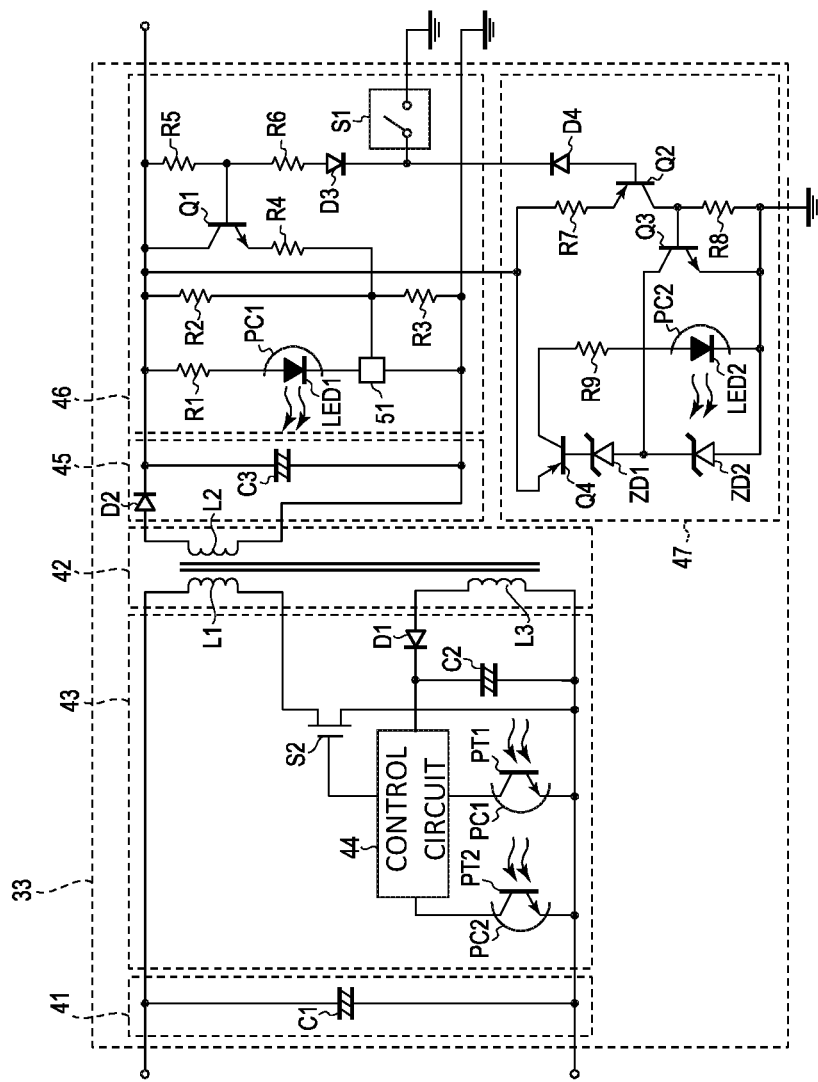
FIGS. 3 and 4 are circuit diagrams of a power conversion circuit according to an embodiment.

FIG. 3 is an explanatory circuit diagram of the power conversion circuit 33. First, the configuration on the first side of the power conversion circuit 33 will be described. The power conversion circuit 33 includes a DC power source 41, an insulating transformer 42, and a switch circuit 43 on the first side. Furthermore, a power factor improvement circuit may be provided on the first side of the power conversion circuit 33.

The DC power source 41 is a circuit for supplying a DC voltage to the insulating transformer 42. The DC power source 41 includes a smoothing capacitor C1. The smoothing capacitor C1 stores electric charges by the pulsating positive voltage supplied from the rectifier circuit 32 and supplies the smoothed DC voltage to the circuits connected in parallel.

The insulating transformer 42 includes a primary winding L1 which generates a magnetic field, and a secondary winding L2 which is isolated from the primary winding L1 and excited by the magnetic field generated by the primary winding L1. The insulating transformer 42 further includes an auxiliary winding L3 which is excited by a magnetic field generated by the primary winding L1 to supply electric power to the switch circuit 43. That is, the secondary winding L2 and the auxiliary winding L3 are electromagnetically coupled to the primary winding L1.

The switch circuit 43 is a circuit for switching on and off the current flowing from the smoothing capacitor C1 to the primary winding L1. The switch circuit 43 includes a semiconductor switch S2, a control circuit 44, a diode D1, a smoothing capacitor C2, a photocoupler PC1, and a photocoupler PC2.

The semiconductor switch S2 is a semiconductor switch for switching the conduction state based on control of the control circuit 44. Based on the control of the control circuit 44, the semiconductor switch S2 turns on and off the current flowing from the smoothing capacitor C1 to the primary winding L1. The semiconductor switch S2 is, for example, an n-type channel FET. A drain terminal of the semiconductor switch S2 is connected to the primary winding L1, a source terminal of the semiconductor switch S2 is connected to a low potential side of the smoothing capacitor C1, and a gate terminal of the semiconductor switch S2 is connected to the control circuit 44. The semiconductor switch S2 switches between the conduction state in which the drain terminal and the source terminal are conducted (i.e., ON state), and the non-conduction state in which the drain terminal and the source terminal are non-conductive (i.e., OFF state), based on a control signal supplied from the control circuit 44 to the gate terminal.

The control circuit 44 is a control circuit for controlling the semiconductor switch S2. The control circuit 44 includes a terminal connected to a high potential side of the smoothing capacitor C2, a terminal connected to the gate terminal of the semiconductor switch S2, a terminal connected to the photocoupler PC1 (hereinafter called the output control terminal, and a terminal connected to the photocoupler PC2 (hereinafter called overvoltage protection terminal). The control circuit 44 inputs a high-frequency pulse signal to the semiconductor switch S2 as the control signal. The control circuit 44 inputs a pulse signal to, for example, the gate terminal of the semiconductor switch S2. Thus, the control circuit 44 switches between the ON state and the OFF state of the semiconductor switch S2 at a high speed. As a result, a high frequency pulse is supplied to the primary winding L1 of the insulating transformer 42 by the potential of the smoothing capacitor C1, and a magnetic field is generated by the primary winding L1.

As described above, the switch circuit 43 functions as a flyback converter for converting a DC voltage into a high frequency pulse. The switch circuit 43 may be configured as another converter such as a half bridge converter for supplying a high frequency pulse to the primary winding L1 of insulating transformer 42 depending on the potential of the smoothing capacitor C1, or a full bridge converter.

The diode D1 rectifies the current generated in the auxiliary winding L3. The smoothing capacitor C2 is connected in parallel with the auxiliary winding L3 as viewed from the control circuit 44. The smoothing capacitor C2 stores electric charges by a current generated in the auxiliary winding L3, and supplies a smoothed DC voltage to the control circuit 44.

The photocoupler PC1 includes a light emitting diode LED1 and a photo transistor PT1. In the photocoupler PC1, when a current flows from the anode of the light-emitting diode LED1 to the cathode and the light-emitting diode LED1 emits light, light interacts with the phototransistor PT1 such that the collector terminal and the emitter terminal of the phototransistor PT1 are electrically connected to each other.

The light emitting diode LED1 of the photocoupler PC1 is provided on the second side of the power conversion circuit 33, and the photo transistor PT1 of the photocoupler PC1 is disposed on the first side of the power conversion circuit 33. The collector terminal of the phototransistor PT1 is connected to the output control terminal of the control circuit 44. The emitter terminal of the phototransistor PT1 is connected to the low potential side of the smoothing capacitor C1. The voltage between the collector terminal and the emitter terminal of the phototransistor PT1 changes in response to the light emitted from the light emitting diode LED1.

The photocoupler PC2 includes a light emitting diode LED2 and a photo transistor PT2. In the photocoupler PC2, when a current flows from the anode of the light-emitting diode LED2 to the cathode and the light-emitting diode LED2 emits light, the light interacts with the phototransistor PT2 such that the collector terminal and the emitter terminal of the phototransistor PT2 are electrically connected to each other.

The light emitting diode LED2 of the photocoupler PC2 is provided on the second side of the power conversion circuit 33, and the photo transistor PT2 of the photocoupler PC2 is disposed on the first side of the power conversion circuit 33. The collector terminal of the phototransistor PT2 is connected to the overvoltage protection terminal of the control circuit 44. The emitter terminal of the phototransistor PT2 is connected to the low potential side of the smoothing capacitor C1. That is, the photocoupler PC2 connects the overvoltage protection terminal of the control circuit 44 to the low potential side of the smoothing capacitor C1 in response to the emission of the light emitting diode LED2.

Next, the configuration of the second side of the power conversion circuit 33 will be described.

The power conversion circuit 33 includes the secondary winding L2 of the insulating transformer 42, a rectifying and smoothing circuit 45, a voltage adjustment circuit 46, and an overvoltage protection circuit 47 of an insulating transformer 42 on the second side. A load in the image processing apparatus 1 (e.g., the conveying unit 16, the image forming unit 17, the system controller 11, and the like) is connected to an output terminal on the second side of the power conversion circuit 33.

The secondary winding L2 is excited in accordance with the magnetic field generated by the primary winding L1, thereby generating electric power. A voltage corresponding to the ratio of the number of turns of the primary winding L1 and the secondary winding L2 is generated in the secondary winding L2.

The rectifying and smoothing circuit 45 is a circuit for rectifying and smoothing electric power generated in the secondary winding L2. The rectifying and smoothing circuit 45 includes a diode D2 and a smoothing capacitor C3.

The diode D2 has an anode connected to the secondary winding L2, and a cathode connected to the high potential side of the smoothing capacitor C3. The diode D2 rectifies the current generated in the secondary winding L2, and supplies the rectified electric current to the smoothing capacitor C3. In some examples, the diode D2 may be replaced by a MOSFET and a synchronous rectification control IC. In such a case, the synchronous rectification can be performed by the MOSFET.

The smoothing capacitor C3 smooths the positive voltage supplied from the diode D2. The smoothing capacitor C3 supplies a DC voltage to the circuits connected in parallel. The high potential side of the smoothing capacitor C3 is connected to the output terminal of the power conversion circuit 33. That is, the load is connected to the smoothing capacitor C3. The smoothing capacitor C3 supplies a smoothed DC voltage to the load (for example, the image forming unit 17). That is, the rectifying and smoothing circuit 45 functions as a DC power source which outputs a DC voltage.

The voltage adjustment circuit 46 adjusts the voltage at the output terminal of the power conversion circuit 33. The voltage adjustment circuit 46 draws a current from the smoothing capacitor C3, and adjusts the voltage at the output terminal of the power conversion circuit 33 to a predetermined voltage in accordance with the amount of current.

The voltage adjustment circuit 46 includes a shunt regulator 51, a resistor R1, a resistor R2, a resistor R3, a resistor R4, a resistor R5, a resistor R6, a diode D3, the light emitting diode LED1 of the photocoupler PC1, a switch Q1, and an output selecting switch S1. The voltage adjustment circuit 46 can pull down or up the potential of the high potential side of the smoothing capacitor C3 in accordance with the voltage dividing ratio of the shunt regulator 51.

The shunt regulator 51 is a constant voltage regulator for adjusting the voltage at the output terminal of the power conversion circuit 33. The shunt regulator 51 includes an input terminal, an output terminal, and a reference voltage terminal. The shunt regulator 51 includes a transistor provided in parallel with the load (that is, between the high potential side of the smoothing capacitor C3 and the GND) and an error amplifier. In the shunt regulator 51, the error amplifier controls the transistor based on the potential of the reference voltage terminal, thereby causing a current to flow from the input terminal to the output terminal.

The input terminal of the shunt regulator 51 is a collector terminal of the transistor. The input terminal of the shunt regulator 51 is connected to the high potential side of the smoothing capacitor C3 via the light emitting diode LED1 of the photocoupler PC1 and the resistor R1 connected in series.

The output terminal of the shunt regulator 51 is an emitter terminal of the transistor. The output terminal of the shunt regulator 51 is connected to GND.

The reference voltage terminal of the shunt regulator 51 is an input terminal of the error amplifier. The output terminal of the error amplifier is connected to the base terminal of the transistor. The reference voltage terminal of the shunt regulator 51 is connected to the high potential side of the smoothing capacitor C3 via the resistor R2. The reference voltage terminal of the shunt regulator 51 is connected to GND via the resistor R3. Further, the reference voltage terminal of the shunt regulator 51 is connected to an output terminal of a switch Q1 (i.e., an emitter terminal), which will be described later, via the resistor R4.

The switch Q1 is a semiconductor switch, and is, for example, an NPN transistor. The switch Q1 may be an n-type MOSFET.

The base terminal of the switch Q1 is connected to a connection point between the resistor R1 and the resistor R6. The emitter terminal of the switch Q1 is connected to the reference voltage terminal of the shunt regulator 51 via the resistor R4. The collector terminal of the switch Q3 is connected to the high potential side of the smoothing capacitor C1.

The output selecting switch S1 may be, for example, a dip switch, a toggle switch, a rocker switch, or a thumb rotary switch. Further, the output selecting switch S1 may be a jumper to change terminals to be connected. The output selecting switch S1 is a switch for switching between a conduction state (ON) and a non-conduction state (OFF) by a human operation. The output selecting switch S1 is connected between the cathode of the diode D3 and GND. For example, the output selecting switch S1 is provided outside of the power supply unit 18 so that an operator can easily switch the states 1.

The overvoltage protection circuit 47 is a circuit for preventing an overvoltage (i.e., a voltage greater than or equal to a rated voltage) from being output from the power conversion circuit 33. The overvoltage protection circuit 47 stops the output of the rectifying and smoothing circuit 45 which is the DC power source when the output voltage becomes equal to or greater than the threshold voltage. For example, the overvoltage protection circuit 47 notifies the control circuit 44 of the first side that the overvoltage is being output, thereby stopping the switching operation of the control circuit 44.

The overvoltage protection circuit 47 includes a switch Q2, a switch Q3, a switch Q4, a resistor R7, a resistor R8, a resistor R9, a first Zener diode ZD1, a diode D4, a second Zener diode ZD2, and the light emitting diode LED2 of the photocoupler PC2.

The switch Q2 is a semiconductor switch, and is, for example, a PNP transistor. The switch Q2 may be a p-type MOSFET.

The base terminal of the switch Q2 is connected to the cathode of the diode D3 and the anode of the diode D4 whose cathode is connected to the output selecting switch S1. The emitter terminal of the switch Q2 is connected to the high potential side of the smoothing capacitor C3 (i.e., the output terminal of the rectifying and smoothing circuit 45) via the resistor R7. The collector terminal of the switch Q2 is connected to GND via the resistor R8.

The switch Q3 is a semiconductor switch, and is, for example, an NPN transistor. The switch Q3 may be an n-type MOSFET.

The base terminal of the switch Q3 is connected to the collector terminal of the switch Q2. The emitter terminal of the switch Q3 is connected to GND. The collector terminal of the switch Q3 is connected to the anode of the first Zener diode ZD1 and the cathode of the second Zener diode ZD2, which will be described later.

The switch Q4 is a semiconductor switch, and is, for example, a PNP transistor. The switch Q4 may be a p-type MOSFET.

The base terminal of the switch Q4 is connected to the cathode of the first Zener diode ZD1. The emitter terminal of the switch Q4 is connected to the high potential side of the smoothing capacitor C3 (i.e., the output terminal of the rectifying and smoothing circuit 45). The collector terminal of the switch Q4 is connected to GND via the resistor R9 and the light emitting diode LED2 of the photocoupler PC2.

The anode of the first Zener diode ZD1 is connected to the collector terminal of the switch Q3 and the cathode of the second Zener diode ZD2. The cathode of the first Zener diode ZD1 is connected to the base terminal of the switch Q4.

The anode of the second Zener diode ZD2 is connected to GND. The cathode of the second Zener diode ZD2 is connected to the anode of the first Zener diode ZD1 and the collector terminal of the switch Q3.

The anode of the light emitting diode LED2 of the photocoupler PC2 is connected to the collector terminal of the switch Q4 via the resistor R9. The cathode of the light emitting diode LED2 of the photocoupler PC2 is connected to GND. The light emitting diode LED2 of the photocoupler PC2 is provided at a position where a current flows in response to the conduction of the first Zener diode ZD1.

The operating configuration of the power conversion circuit 33 having the above-described configuration is changed depending on the states of the output selecting switch S1. First, the operation of the power conversion circuit 33 in the case where the output selecting switch S1 is OFF (i.e., the first mode in which the DC voltage of 24V is output) will be described.

(State of Each Switch in Voltage Adjustment Circuit 46)

When the output selecting switch S1 is off, no current flows through the resistor R5, the resistor R6, and the diode D3 connected in series. Therefore, the switch Q1 is also turned off.

(State of Each Switch of the Overvoltage Protection Circuit 47).

In the voltage adjustment circuit 46, when the output selecting switch S1 is OFF, the current does not flow through the base terminal of the switch Q2 of the overvoltage protection circuit 47, and thus the switch Q2 is turned off. Further, when the switch Q2 is OFF, no current flows through the base terminal of the switch Q3, and thus the switch Q3 is also turned OFF.

(Operation of Shunt Regulator 51)

When the switch Q1 is OFF, the resistor R2 and the resistor R3 are connected to the reference voltage terminal of the shunt regulator 51. In this case, the voltage Vout1 is output from the output terminal of the power conversion circuit 33, which is adjusted by the shunt regulator 51 based on the reference voltage Vref, which is the voltage applied to the reference voltage terminal of the shunt regulator 51, and the voltage division ratio between the resistor R2 and the resistor R3. The voltage Vout1 is calculated by the following equation:

$$Vout1=(1+R2/R3)\times Vref.$$

Note that the voltage Vout1 is, for example, 24V.

Further, the photo transistor PT1 of the photocoupler PC1 is turned on by the current drawn into the shunt regulator 51, and the light emitting diode LED1 of the photocoupler PC1 emits light. When the light emitting diode LED1 of the photocoupler PC1 emits light, the photo transistor PT1 of the photocoupler PC1 on the first side of the power conversion circuit 33 is turned on. As a result, a current flows from the control circuit 44 to the low potential side of the smoothing capacitor C1 via the phototransistor PT1 on the first side. The current value of the current flowing through the phototransistor PT1 varies depending on the current flowing through the light emitting diode LED1 of the photocoupler PC1, i.e., the current drawn into the shunt regulator 51.

(Operation of the Overvoltage Protection Circuit 47)

When the switch Q2 and the switch Q3 are OFF, the first Zener diode ZD1 and the second Zener diode ZD2 are connected in series between the base terminal of the switch Q4 and GND. In this case, the potential difference between the potential of the emitter terminal of the switch Q4 (that is, the potential of the output terminal of the rectifying and smoothing circuit 45=output voltage=Vout1) and GND is applied to the first Zener diode ZD1 and the second Zener diode ZD2. When the output voltage becomes equal to or higher than the sum of the Zener voltage of the first Zener diode ZD1 and the Zener voltage of the second Zener diode ZD2 (hereinafter called the first threshold voltage), the switch Q4 is turned on. The first threshold voltage is, for example, 27V. When the switch Q4 is turned on, a current flows through the resistor R9 and the light emitting diode LED 9 of the photocoupler PC2, and the light emitting diode LED2 of the photocoupler PC2 emits light. When the light emitting diode LED2 of the photocoupler PC2 emits light, the photo transistor PT2 of the photocoupler PC2 is turned on in the first side. As a result, a current flows from the overvoltage protection terminal of the control circuit 44 to the low potential side of the smoothing capacitor C1 through the phototransistor PT2 on the first side of the power conversion circuit 33.

(Operation of Control Circuit 44)

The control circuit 44 controls the semiconductor switch S2 to supply a high frequency pulse to the primary winding L1 of the insulating transformer 42 by the potential of the smoothing capacitor C1, thereby generating a magnetic field in the primary winding L1.

The control circuit 44 controls the on/off duty ratio of the pulse signal to be input to the semiconductor switch S2 based on the current flowing from the output control terminal to the low potential side of the smoothing capacitor C1 via the phototransistor PT1 of the photocoupler PC1. As described above, the voltage between the emitter terminal and the collector terminal of the phototransistor PT1 of the photocoupler PC1 changes in accordance with the emission of the light emitting diode LED1. That is, the voltage between the emitter terminal and the collector terminal of the phototransistor PT1 of the photocoupler PC1 varies according to the current flowing from the rectifying and smoothing circuit 45 on the second side of the power conversion circuit 33 to the input terminal of the shunt regulator 51. The control circuit 44 controls the on/off duty ratio of the pulse signal to be inputted to the semiconductor switch S2 based on the current flowing to the low potential side of the smoothing capacitor C1 or the voltage between the collector terminal and the emitter terminal of the phototransistor PT1 via the phototransistor PT1 of the photocoupler PC1. Thus, the control circuit 44 controls the intensity of the magnetic field generated in the primary winding L1 of the insulating transformer 42. Thus, the electric power supplied to the second side is controlled.

In addition, when a current flows from the overvoltage protection terminal to the low potential side of the smoothing capacitor C1 through the phototransistor PT2, the control circuit 44 stops the operation of the semiconductor switch S2. That is, the control circuit 44 stops the operation of the semiconductor switch S2 when the output voltage on the second side becomes equal to or greater than the first threshold voltage corresponding to the sum of the Zener voltage of the first Zener diode ZD1 and the Zener voltage of the second Zener diode ZD2. Thus, the power conversion circuit 33 stops the output of the rectifying and smoothing circuit 45 which is the DC power source, thereby preventing the output voltage exceeding the rated value from continuing to be output.

Next, the operation of the power conversion circuit 33 in the case where the output selecting switch S1 is ON (i.e., the second mode in which the DC voltage of 12V is output) will be described.

(State of Each Switch in Voltage Adjustment Circuit 46).

When the output selecting switch S1 is on, a current flows through the resistor R5, the resistor R6, and the diode D3 connected in series, and the switch Q1 is turned on.

(State of Each Switch of the Overvoltage Protection Circuit 47).

In the voltage adjustment circuit 46, when the output selecting switch S1 is turned on, a current flows from the base terminal of the switch Q2 of the overvoltage protection circuit 47. As a result, the switch Q2 is turned on. When the switch Q2 is turned on, the output voltage of the rectifying and smoothing circuit 45 is applied to the base terminal of the switch Q3 via the resistor R7 and the switch Q2. As a result, the switch Q3 is turned on.

(Operation of Shunt Regulator 51)

When the switch Q1 is ON, the resistor R2 and the resistor R4 are connected in parallel between the reference voltage terminal of the shunt regulator 51 and the high potential side of the smoothing capacitor C3, and the resistor R3 is connected between the reference voltage terminal of the shunt regulator 51 and GND. In this case, the resistor R2 and the resistor R4 conceptually make up a combined resistor R0, the resistance value of which can be calculated by the following equation:

$R0 = R2 \times R4/(R2+R4)$.

Therefore, the voltage Vout2 output from the output terminal of the power conversion circuit 33 can be calculated by the following equation:

$Vout2 = (1+R0/R3) \times Vref$.

Note that the combined resistance value R0 is smaller than the resistance value R2. Therefore, the voltage dividing ratio of the shunt regulator 51 is changed, and the voltage Vout2 is smaller than the voltage output when the switch Q1 is off. The voltage Vout2 is, for example, 12V.

(Operation of the Overvoltage Protection Circuit)

When the switch Q2 and the switch Q3 are turned on, the anode of the first Zener diode ZD1 is connected to GND via the switch Q3. That is, a short circuit path is formed in parallel with the second Zener diode ZD2. In this case, a potential equal to the difference between the potential of the emitter terminal of the switch Q4 (that is, the potential of the output terminal of the rectifying and smoothing circuit 45=output voltage=Vout2) and GND is applied to the first Zener diode ZD1. Since the short circuit path is formed in parallel with the second Zener diode ZD2, the output voltage is insubstantially applied to the second Zener diode ZD2. When the output voltage becomes equal to or higher than the Zener voltage of the first Zener diode ZD1 (hereinafter called the second threshold voltage), the switch Q4 is turned on. The second threshold voltage is, for example, 15V. When the switch Q4 is turned on, a current flows through the resistor R9 and light emitting diode LED2 of the photocoupler PC2, and the light emitting diode LED2 emits light. When the light emitting diode LED2 emits light, the photo transistor PT2 of the photocoupler PC2 on the first side of the power conversion circuit 33 is turned on. As a result, a current flows from the overvoltage protection terminal of the control circuit 44 to the low potential side of the smoothing capacitor C1 through the phototransistor PT2 in the first side.

(Operation of Control Circuit)

When the output selecting switch S1 is on, the control circuit 44 controls the semiconductor switch S2 to supply a high frequency pulse to the primary winding L1 of the insulating transformer 42 by the potential of the smoothing capacitor C1, thereby generating a magnetic field in the primary winding L1.

The control circuit 44 stops the operation of the semiconductor switch S2 when a current flows from the overvoltage protection terminal to the low potential side of the smoothing capacitor C1 via the phototransistor PT2. That is, in the control circuit 44, when the output voltage on the second side becomes equal to or greater than the second threshold voltage corresponding to the Zener voltage of the first Zener diode ZD1, the operation of the semiconductor switch S2 is stopped. Thus, the power conversion circuit 33 stops the output of the rectifying and smoothing circuit 45 which is the DC power source, thereby preventing the output voltage exceeding the rated value from being output.

As described above, the power conversion circuit 33 is configured to supply electric power to from the first side to the second side in a state in which the first side and the second side are electrically isolated from each other by the insulating transformer 42. The power conversion circuit 33 includes the smoothing capacitor C1 functioning as the DC power supply, the semiconductor switch S2, and the control circuit 44 on the first side. The insulating transformer 42 includes the primary winding L1, the secondary winding L2 electromagnetically coupled to the primary winding L1, and the auxiliary winding L3. The control circuit 44 turns on and off a switch for switching the connection between the smoothing capacitor C1 and the primary winding L1, thereby generating a magnetic field in the primary winding L1.

Further, the power conversion circuit 33 includes the rectifier smoothing circuit 45, the voltage adjustment circuit 46 including the shunt regulator 51, and the overvoltage protection circuit 47 on the secondary side. The rectifying and smoothing circuit 45 is connected to the secondary winding L2, rectifies and smooths the current generated in the secondary winding L2, and outputs a DC voltage. The shunt regulator 51 adjusts the output voltage of the rectifying and smoothing circuit 45 based on the voltage of the reference voltage terminal connected to the output terminal of the rectifying and smoothing circuit 45 through the resistor R2 and grounded via the resistor R3. The overvoltage protection circuit 47 stops the output of the rectifying and smoothing circuit 45 when the output voltage of the rectifying and smoothing circuit 45 exceeds a threshold voltage.

The voltage adjustment circuit 46 switches the output voltages according to the states of the output selecting switch S1. For example, the voltage adjustment circuit 46 operates in either the first mode in which the output selecting switch S1 is off and the output voltage from the rectifying and smoothing circuit 45 is the first voltage (e.g., 24V), or the second mode in which the output selecting switch S1 is on and the output voltage from the rectifying and smoothing circuit 45 is the second voltage (e.g., 12V). That is, the voltage adjustment circuit 46 switches the first mode in which the output voltage of the rectifying and smoothing circuit 45 which is the DC power source is set to the first voltage, and the second mode in which the output voltage of the rectifying and smoothing circuit 45 is set to the second voltage which is lower than the first voltage, according to the on/off states of the output selecting switch S1.

The overvoltage protection circuit 47 switches the threshold voltages for stopping the voltage output from the rectifying and smoothing circuit 45 depending on the states of the output selecting switch S1. For example, in the first mode, the overvoltage protection circuit 47 stops the voltage output from the rectifying and smoothing circuit 45 when the voltage is equal to or greater than a first threshold (for example, 27 V) corresponding to the sum of the Zener voltage of the first Zener diode ZD1 and the Zener voltage of the second Zener diode ZD2. Further, for example, in the second mode, the overvoltage protection circuit 47 stops the voltage output from the rectifying and smoothing circuit 45 when the voltage is equal to or greater than the second threshold voltage (for example, 15V or more) corresponding to the Zener voltage of the first Zener diode ZD1. In the second mode, the overvoltage protection circuit 47 forms a short circuit path in parallel with the second Zener diode ZD2, whereby the Zener voltage of the first Zener diode ZD1 is used as the second threshold voltage.

That is, in the overvoltage protection circuit 47, during the second mode in which the output voltage of the rectifying and smoothing circuit 45 is the first voltage (24V), the overvoltage protection threshold voltage is the first threshold voltage (for example, 27V), and in the first mode in which the output voltage of the rectifying and smoothing circuit 45 is the second voltage (12V), the overvoltage protection threshold voltage is a second threshold voltage (for example, 15V). In this way, the overvoltage protection circuit 47 changes the overvoltage protection thresholds in conjunction with the voltages output from the rectifying and smoothing circuit 45. Thus, the power conversion circuit 33 can prevent a state in which the protection function is not normally operated or a protection function is excessively operated if an erroneous threshold has been set.

The overvoltage protection circuit 47 is not limited to the above-described configuration. In general, the overvoltage protection circuit 47 may have any configuration as long as the overvoltage protection threshold voltage can be switched in conjunction with the first mode and the second mode.

Figure 4:
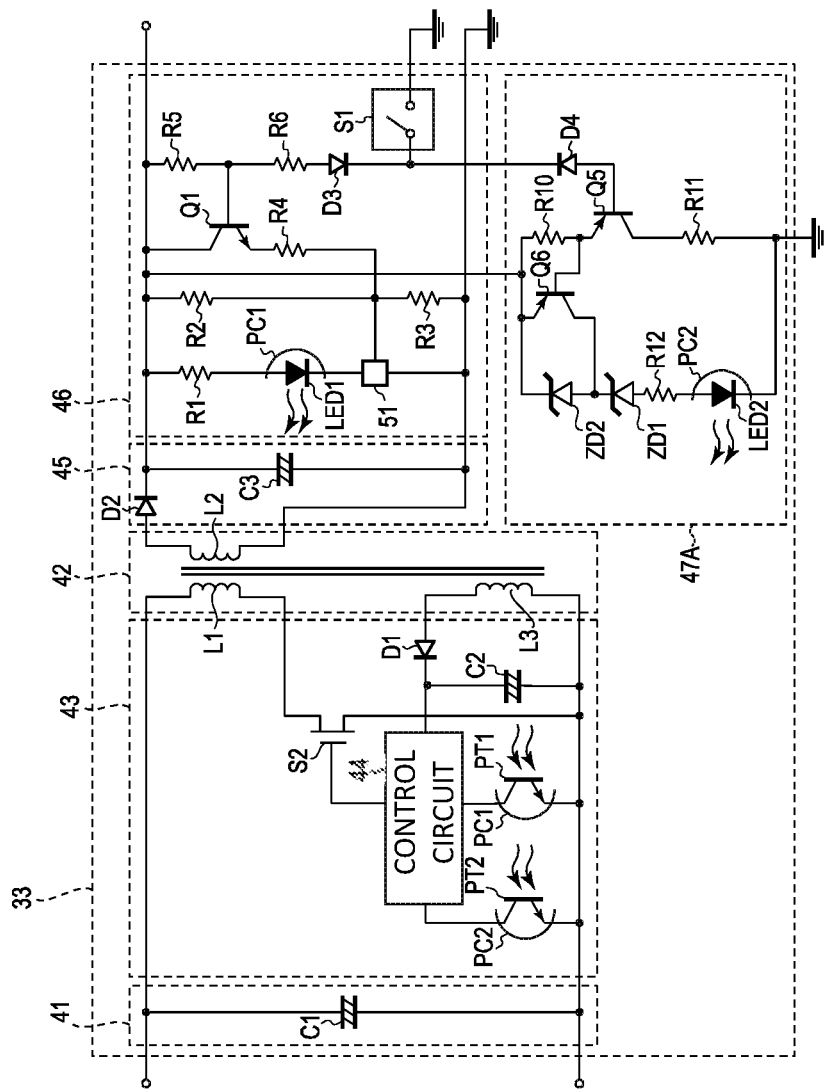

FIG. 4 is an explanatory circuit diagram of an overvoltage protection circuit 47A which is a modification example of the overvoltage protection circuit 47 described above.

The overvoltage protection circuit 47A includes a switch Q5, a switch Q6, a resistor R10, a resistor R11, a resistor R12, a diode D4, a first Zener diode ZD1, a second Zener diode ZD2, and a light emitting diode LED2 of a photocoupler PC2.

The switch Q5 is a semiconductor switch, and is, for example, a PNP transistor. The switch Q5 may be a p-type MOSFET.

The base terminal of the switch Q5 is connected to the cathode of the diode D3 via the diode D4. The emitter terminal of the switch Q5 is connected to the high potential side of the smoothing capacitor C3 (i.e., the output terminal of the rectifying and smoothing circuit 45) via the resistor R10. The collector terminal of the switch Q5 is connected to GND via the resistor R11.

The switch Q6 is a semiconductor switch, and is, for example, a PNP transistor. In some examples, the switch Q6 may be a p-type MOSFET.

The base terminal of the switch Q6 is connected to the emitter terminal of the switch Q5. The emitter terminal of the switch Q6 is connected to the high potential side of the smoothing capacitor C3 (i.e., the output terminal of the rectifying and smoothing circuit 45). The collector terminal of the switch Q6 is connected to the cathode of the first Zener diode ZD1 and the anode of the second Zener diode ZD2.

The anode of the first Zener diode ZD1 is connected to the anode of the light emitting diode LED2 of the photocoupler PC2 through the resistor R12. The cathode of the first Zener diode ZD1 is connected to the anode of the second Zener diode ZD2 and to the collector terminal of the switch Q6.

The anode of the second Zener diode ZD2 is connected to the cathode of the first Zener diode ZD2 and to the collector terminal of the switch Q6. The cathode of the second Zener diode ZD2 is connected to the emitter terminal of the switch Q6 and to the high potential side of the smoothing capacitor C3 (i.e., the output terminal of the rectifying and smoothing circuit 45).

The anode of the light emitting diode LED2 of the photocoupler PC2 is connected to the anode of the first Zener diode ZD1 via the resistor R12. The cathode of the light emitting diode LED2 of the photocoupler PC2 is connected to GND.

The operation of the overvoltage protection circuit 47A in a case where the output selecting switch S1 is OFF will be described.

In the voltage adjustment circuit 46, when the output selecting switch S1 is off, no current flows through the base terminal of the switch Q5 of the overvoltage protection circuit 47, and the switch Q5 is turned off. Further, since no current flows through the emitter terminal of the switch Q5, no current flows to the base terminal of the switch Q6, and the switch Q6 is also turned off.

When the switch Q5 and the switch Q6 are off, the first Zener diode ZD1 and the second Zener diode ZD2 are connected in series between the high potential side of the smoothing capacitor C3 (i.e., the output terminal of the rectifying and smoothing circuit 45) and GND. In this case, a potential difference between the high potential side of the smoothing capacitor C3 (i.e., the output terminal of the rectifying and smoothing circuit 45) and GND is applied to the first Zener diode ZD1 and the second Zener diode ZD2 via the resistor R12 and the light emitting diode LED2 of the photocoupler PC2. When the output voltage becomes equal to or greater than the sum of the Zener voltage of the first Zener diode ZD1 and the Zener voltage of the second Zener diode ZD2 (i.e., the first threshold voltage), a current flows through the resistor R12 and the light emitting diode LED2, and the light emitting diode LED2 emits light. When the light emitting diode LED2 emits light, the photo transistor PT2 of the photocoupler PC2 on the first side of the power conversion circuit 33 is turned on. The first threshold voltage is, for example, 27V.

In the voltage adjustment circuit 46, when the output selecting switch S1 is turned on, a current flows from the base terminal of the switch Q5 of the overvoltage protection circuit 47. As a result, the switch Q5 is turned on. When the switch Q5 is turned on, the output voltage of the rectifying and smoothing circuit 45 is applied to the base terminal of the switch Q6 via the resistor R10 and the switch Q5. As a result, the switch Q6 is turned on.

When the switch Q5 and the switch Q6 are on, the cathode of the first Zener diode ZD1 is connected to the output terminal of the rectifying and smoothing circuit 45. That is, a short circuit path is formed in parallel with the second Zener diode ZD2. When the short circuit path is formed in parallel with the second Zener diode ZD2, the output voltage of the rectifying and smoothing circuit 45 is insubstantially applied to the second Zener diode ZD2. Therefore, when the output voltage of the rectifying and smoothing circuit 45 becomes equal to or higher than the Zener voltage of the first Zener diode ZD1 (i.e., the second threshold voltage), the first Zener diode ZD1 is turned on, and a current flows. When a current flows through the first Zener diode ZD1, a current flows also through the resistor R9 connected in series to the first Zener diode ZD1 and the light emitting diode LED2 of the photocoupler PC2, and the light-emitting diode LED2 of the photocoupler PC2 emits light. When the light emitting diode LED2 of the photocoupler PC2 emits light, the photo transistor PT2 of the photocoupler PC2 on the first side of the power conversion circuit 33 is turned on. As a result, a current flows from the overvoltage protection terminal of the control circuit 44 to the low potential side of the smoothing capacitor C1 through the phototransistor PT2 on the first side of the power conversion circuit 33. The second threshold voltage is, for example, 15V.

The control circuit 44 stops the operation of the semiconductor switch S2 when a current flows from the overvoltage protection terminal to the low potential side of the smoothing capacitor C1 via the phototransistor PT2. That is, in the control circuit 44, when the voltage output from the second side becomes equal to or greater than the second threshold voltage corresponding to the Zener voltage of the first Zener diode ZD1, the operation of the semiconductor switch S2 is stopped. Thus, the power conversion circuit 33 stops the output of the rectifying and smoothing circuit 45 which is a DC power source, thereby preventing the output voltage exceeding the rated value from continuing to be output.

Also with the configuration described above, the power conversion circuit 33 can prevent a state in which the protection function is not normally operated or a protection function is excessively operated when an erroneous threshold voltage is set.

Although the power conversion circuit 33 is incorporated in an image processing apparatus 1 in the above embodiment, the present disclosure is not limited to this configuration. The power conversion circuit 33 may be incorporated in any device, such as a commodity registration device.

Although a Zener diode has been described as an overvoltage detecting element in the above example embodiment, a comparator, a voltage monitoring IC, or the like may instead be used to detect an overvoltage at an input terminal, and another element and an arrangement having a function of generating a current and a voltage at the output terminal may be used.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed:

1. A power converter, comprising:
   a transformer including a first winding and a second winding;
   a switching circuit configured to switch voltages applied to the first winding;
   a power supply circuit connected to the second winding and configured to rectify and smooth a current flowing in the second winding and generate a DC voltage;
   an adjustment circuit configured to adjust the generated DC voltage according to an operation mode of the power converter including a first mode in which the generated DC voltage is adjusted to a first DC voltage and a second mode in which the generated DC voltage is adjusted to a second DC voltage that is less than the first DC voltage, and output the adjusted DC voltage; and
   a protection circuit including a first Zener diode and a second Zener diode and configured to stop output of the adjusted DC voltage, each of the first and second Zener diodes having a cathode and an anode, the cathode of the first Zener diode being electrically connected to the power supply circuit, the second Zener diode being connected in series to the first Zener diode in the first mode and being short-circuited in the second mode, the anode of one of the first and second Zener diodes being directly connected to the cathode of the other of the first and second Zener diodes via a wire.

2. The power converter according to claim 1, wherein
   the protection circuit further includes a light emitting diode (LED) that emits light when a current flows in the first Zener diode, and
   the switching circuit includes a phototransistor and is configured to stop applying the voltages to the first winding when a current flows in the phototransistor.

3. The power converter according to claim 1, further comprising:
   a photocoupler comprising:
      a light emitting diode that emits light when a current flows in the first Zener diode, and
      a phototransistor connected to the switching circuit and coupled to the light emitting diode.

4. The power converter according to claim 1, wherein the protection circuit further includes a switch connected in parallel to the second Zener diode and is turned on in the second mode.

5. The power converter according to claim 4, wherein the anode of the first Zener diode is connected to both the cathode of the second Zener diode and the switch.

6. The power converter according to claim 5, wherein the switch is a transistor including a collector terminal connected to the cathode of the second Zener diode and an emitter terminal connected to the anode of the second Zener diode.

7. The power converter according to claim 4, wherein the switch is connected in series to the first Zener diode and the power supply circuit therebetween.

8. The power converter according to claim 7, wherein the switch is a transistor including an emitter terminal connected to the cathode of the second Zener diode and a collector terminal connected to both the anode of the second Zener diode and the cathode of the first Zener diode.

9. The power converter according to claim 1, wherein the adjustment circuit includes a first switch that is turned off in the first mode and is turned on in the second mode.

10. The power converter according to claim 9, wherein the protection circuit further includes a second switch connected in parallel with the second Zener diode and turned on when the first switch is turned on.

11. An image processing apparatus, comprising:
an image forming unit configured to form an image on a sheet; and
a power converter configured to supply electric power to the image forming unit and including:
a transformer including a first winding and a second winding;
a switching circuit configured to switch voltages applied to the first winding;
a power supply circuit connected to the second winding and configured to rectify and smooth a current flowing in the second winding and generate a DC voltage;
an adjustment circuit configured to adjust the generated DC voltage according to an operation mode of the power converter including a first mode in which the generated DC voltage is adjusted to a first DC voltage and a second mode in which the generated DC voltage is adjusted to a second DC voltage that is less than the first DC voltage, and output the adjusted DC voltage; and
a protection circuit including a first Zener diode and a second Zener diode and configured to stop output of the adjusted DC voltage, each of the first and second Zener diodes having a cathode and an anode, the cathode of the first Zener diode being electrically connected to the power supply circuit, the second Zener diode being connected in series to the first Zener diode in the first mode and being short-circuited in the second mode, the anode of one of the first and second Zener diodes being directly connected to the cathode of the other of the first and second Zener diodes via a wire.

12. The image processing apparatus according to claim 11, wherein
the protection circuit further includes a light emitting diode (LED) that emits light when a current flows in the first Zener diode, and
the switching circuit includes a phototransistor and is configured to stop applying the voltages to the first winding when a current flows in the phototransistor.

13. The image processing apparatus according to claim 11, further comprising:
a photocoupler comprising:
a light emitting diode that emits light when a current flows in the first Zener diode, and
a phototransistor connected to the switching circuit and coupled to the light emitting diode.

14. The image processing apparatus according to claim 11, wherein the protection circuit further includes a switch connected in parallel with the second Zener diode and turned on in the second mode.

15. The image processing apparatus according to claim 14, wherein the anode of the first Zener diode is connected to both the cathode of the second Zener diode and the switch.

16. The image processing apparatus according to claim 15, wherein the switch is a transistor including a collector terminal connected to the cathode of the second Zener diode and an emitter terminal connected to the anode of the second Zener diode.

17. The image processing apparatus according to claim 14, wherein the switch is connected in series to the first Zener diode and the power supply circuit therebetween.

18. The image processing apparatus according to claim 17, wherein the switch is a transistor including an emitter terminal connected to the cathode of the second Zener diode and a collector terminal connected to both the anode of the second Zener diode and the cathode of the first Zener diode.

19. The image processing apparatus according to claim 11, wherein the adjustment circuit includes a first switch that is turned off in the first mode and is turned on in the second mode.

20. The image processing apparatus according to claim 19, wherein the protection circuit further includes a second switch connected in parallel with the second Zener diode and turned on when the first switch is turned on.

* * * * *